United States Patent
Joshi et al.

(10) Patent No.: US 7,813,373 B2
(45) Date of Patent: Oct. 12, 2010

(54) SYSTEMS, METHODS AND APPARATUS FOR DETECTING TIME SLOT INTERFERENCE AND RECOVERING FROM TIME SLOT INTERFERENCE IN AN AD HOC WIRELESS COMMUNICATION NETWORK

(75) Inventors: Avinash Joshi, Orlando, FL (US); Manish Shukla, Altamonte Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 1022 days.

(21) Appl. No.: 11/420,392

(22) Filed: May 25, 2006

(65) Prior Publication Data

US 2007/0274272 A1 Nov. 29, 2007

(51) Int. Cl.
H04L 12/43 (2006.01)

(52) U.S. Cl. ........................ 370/458; 455/450; 455/451; 455/452.1; 455/452.2; 455/453; 455/454; 455/455; 370/329; 370/330; 370/340; 370/341; 370/350; 370/436; 370/437; 370/442; 370/445; 370/447; 370/459; 370/461

(58) Field of Classification Search .................. 455/450, 455/451, 452.1, 452.2, 453, 454, 455; 370/329, 370/330, 340, 341, 350, 436, 437, 442, 445, 370/447, 458, 459, 461
See application file for complete search history.

(56) References Cited

U.S. PATENT DOCUMENTS

| | | | |
|---|---|---|---|
| 5,680,388 A | 10/1997 | Kahre | |
| 5,732,076 A | 3/1998 | Ketseoglou et al. | |
| 6,041,238 A * | 3/2000 | Tanoue | 455/452.2 |
| 6,388,997 B1 | 5/2002 | Scott | |
| 6,442,138 B1 | 8/2002 | Yin et al. | |
| 7,020,439 B2 | 3/2006 | Sinivaara et al. | |
| 7,349,362 B2 | 3/2008 | Belcea | |
| 7,561,542 B2 | 7/2009 | Alapuranen | |
| 2003/0058792 A1 | 3/2003 | Shao et al. | |
| 2003/0161291 A1* | 8/2003 | Kramer et al. | 370/347 |
| 2003/0179756 A1 | 9/2003 | Cain | |
| 2004/0028018 A1* | 2/2004 | Cain | 370/338 |
| 2004/0032847 A1 | 2/2004 | Cain | |
| 2004/0063401 A1 | 4/2004 | Meckelburg et al. | |

(Continued)

OTHER PUBLICATIONS

PCT International Search Report Application No. PCT/US2007/65504 Dated Sep. 22, 2008—7 Pages.

(Continued)

*Primary Examiner*—Patrick N Edouard
*Assistant Examiner*—Shantell Heiber
(74) *Attorney, Agent, or Firm*—Randi L. Karpinia

(57) ABSTRACT

In a network comprising a source, a destination, and intermediate nodes along a route between the source and the destination, techniques are provided for allocating one or more time slots to transmit a particular data stream along the route based on the QoS requirements to transmit the particular data stream. In one implementation, a Scout Request message (SRM) is sent from the source to the destination to allocate time slots along the route to transmit a particular data stream to the destination. The SRM can include QoS requirements to transmit the particular data stream. Each intermediate node along the route can allocate one or more time slots to transmit the particular data stream based on the QoS requirements needed to transmit the particular data stream along the route.

20 Claims, 9 Drawing Sheets

U.S. PATENT DOCUMENTS

| | | | |
|---|---|---|---|
| 2004/0143842 | A1 | 7/2004 | Joshi |
| 2005/0053004 | A1 | 3/2005 | Cain et al. |
| 2005/0058151 | A1* | 3/2005 | Yeh ............................ 370/338 |
| 2005/0099943 | A1 | 5/2005 | Naghian et al. |
| 2005/0169222 | A1 | 8/2005 | Ayyagari et al. |
| 2005/0169257 | A1 | 8/2005 | Lahetkangas et al. |
| 2005/0172199 | A1 | 8/2005 | Miller et al. |
| 2005/0190784 | A1 | 9/2005 | Stine |
| 2005/0195849 | A1 | 9/2005 | Rajkotia et al. |
| 2005/0201319 | A1 | 9/2005 | Lee et al. |
| 2006/0268792 | A1* | 11/2006 | Belcea ........................ 370/338 |
| 2007/0133457 | A1* | 6/2007 | Doi et al. ..................... 370/329 |
| 2007/0211686 | A1 | 9/2007 | Belcea et al. |
| 2008/0273549 | A1* | 11/2008 | Orfanos et al. ............... 370/462 |

OTHER PUBLICATIONS

PCT International Search Report with Written Opinion—Application No. PCT/US2007/064659 Mailed Nov. 26, 2007—9 pages.

PCT/US2007/065504, PCT Preliminary Report on Patentability, mailed Dec. 11, 2008, 8 pages.

PCT/US2007/064659, PCT Preliminary Report on Patentability, mailed Dec. 11, 2008, 8 pages.

USPTO, U.S. Appl. No. 11/420,424, Office Action, Non-Final Rejection, Oct. 22, 2008, 18 pages.

USPTO, U.S. Appl. No. 11/420,424, Office Action, Final Rejection, Apr. 3, 2009, 13 pages.

USPTO, U.S. Appl. No. 11/420,424, Office Action, Non-Final Rejection, Non-Final Rejection, Sep. 2, 2009, 16 pages.

USPTO, U.S. Appl. No. 11/420,424, Office Action, Final Rejection, Jan. 25, 2010, 13 pages.

USPTO, U.S. Appl. No. 11/383,013, Office Action, Non-Final Rejection, Aug. 4, 2008, 10 pages.

PCT/US07/67046, PCT Search Report and Written Opinion, mailed Aug. 21, 2008, 10 pages.

PCT/US2007/067046, PCT Preliminary Report on Patentability, mailed Nov. 27, 2008, 8 pages.

Australian Patent Office, Australian Application No. 2007267758, Office Action, Examiner's Report, Jan. 8, 2010, 2 pages.

* cited by examiner

300

LOCAL COMMUNICATION MAP

| TIME SLOT # | SELF TX | SELF RX | NBR TX | NBR RX | NBRTX LIST | NBRRX LIST |
|---|---|---|---|---|---|---|
|  |  |  |  |  |  |  |
|  |  |  |  |  |  |  |

FIELD DESCRIPTION OF LCM

| FIELD | DESCRIPTION |
|---|---|
| TIME SLOT # | THE TIME SLOT NUMBER RELATIVE TO THE START OF FRAME. THE NUMBER OF ENTRIES IN LCM WILL BE EQUAL TO THE NUMBER OF TIME SLOTS IN A FRAME |
| SELF TX | ONE BIT VALUE SIGNIFYING WHETHER THE NODE ITSELF IS TRANSMITTING ON THIS TIME SLOT OR NOT. 1 - TRANSMITTING, 0 - NOT TRANSMITTING |
| SELF RX | ONE BIT VALUE SIGNIFYING WHETHER THE NODE ITSELF IS RECEIVING ON THIS TIME FRAME OR NOT. 1 - RECEIVING, 0 - NOT RECEIVING |
| NBR TX | ONE BIT VALUE SIGNIFYING WHETHER ONE OF THE NEIGHBORS OF THE NODE IS TRANSMITTING OR NOT. 1 - TRANSMITTING, 0 - NOT TRANSMITTING |
| NBR RX | ONE BIT VALUE SIGNIFYING WHETHER ONE OF THE NEIGHBORS OF THE NODE IS RECEIVING ON THIS TIME SLOT OR NOT. 1 - RECEIVING, 0 - NOT RECEIVING |
| NBRTX LIST | THIS FIELD POINTS TO A LINK LIST OF ALL THE NEIGHBORS THAT ARE CURRENTLY TRANSMITTING ON THIS SLOT |
| NBRRX LIST | THIS FIELD POINTS TO A LINK LIST OF ALL THE NEIGHBORS THAT ARE CURRENTLY RECEIVING ON THIS SLOT |

*FIG. 4*

POSSIBLE LCM SCENARIOS

500

| TIME SLOT # | SELF TX | SELF RX | NBR TX | NBR RX | NBRTX LIST | NBRRX LIST | CASE # |
|---|---|---|---|---|---|---|---|
| | 0 | 0 | 0 | 0 | | | 1 |
| | 0 | 0 | 0 | 1 | | → | 2 |
| | 0 | 0 | 1 | 0 | → | | 3 |
| | 0 | 0 | 1 | 1 | → | → | 4 |
| | 0 | 1 | 1 | 0 | → | | 5 |
| | 0 | 1 | 1 | 1 | → | → | 6 |
| | 1 | 0 | 0 | 1 | | → | 7 |
| | 1 | 0 | 1 | 1 | → | → | 8 |

| STRM # | SRC ADDR | DEST ADDR | DATA SLOT ALLOCATED | EXP TIME | PREV HOP | NEXT HOP | DATA BUFFER | SELFRX SLOT | DATA RATE | DELAY |
|---|---|---|---|---|---|---|---|---|---|---|

TIME SLOT UTILIZATION MAP

| VALUE | DESCRIPTION |
|---|---|
| 00 | TIME SLOT IS FREE |
| 01 | NODE IS TRANSMITTING IN THIS TIME SLOT (SELFTX = 1) |
| 10 | NODE IS RECEIVING IN THIS TIME SLOT (SELFRX = 1) |
| 11 | SOME NEIGHBORING NODE IS TRANSMITTING IN THIS TIME SLOT |

MAPPING OF LCM TO TSUM

| VALUE | DESCRIPTION | CASE # |
|---|---|---|
| 00 | TIME SLOT IS FREE | CASE 1 & CASE 2 |
| 01 | NODE IS TRANSMITTING IN THIS TIME SLOT | CASE 7 & CASE 8 |
| 10 | NODE IS RECEIVING IN THIS TIME SLOT | CASE 5 & CASE 6 |
| 11 | SOME NEIGHBORING NODE IS TRANSMITTING IN THIS TIME SLOT | CASE 3 & CASE 4 |

MAPPING OF LCM TO TPSM AND RPSM

| TIME SLOT # | SELF TX | SELF RX | NBR TX | NBR RX | CASE # | TPSM | RPSM |
|---|---|---|---|---|---|---|---|
|  | 0 | 0 | 0 | 0 | 1 | 1 | 1 |
|  | 0 | 0 | 0 | 1→ | 2 | 0 | 1 |
|  | 0 | 0 | 1→ | 0 | 3 | 1 | 0 |
|  | 0 | 0 | 1→ | 1→ | 4 | 0 | 0 |
|  | 0 | 1 | 1→ | 0 | 5 | 0 | 0 |
|  | 0 | 1 | 1→ | 1→ | 6 | 0 | 0 |
|  | 1 | 0 | 0 | 1→ | 7 | 0 | 0 |
|  | 1 | 0 | 1→ | 1→ | 8 | 0 | 0 |

*FIG. 9*

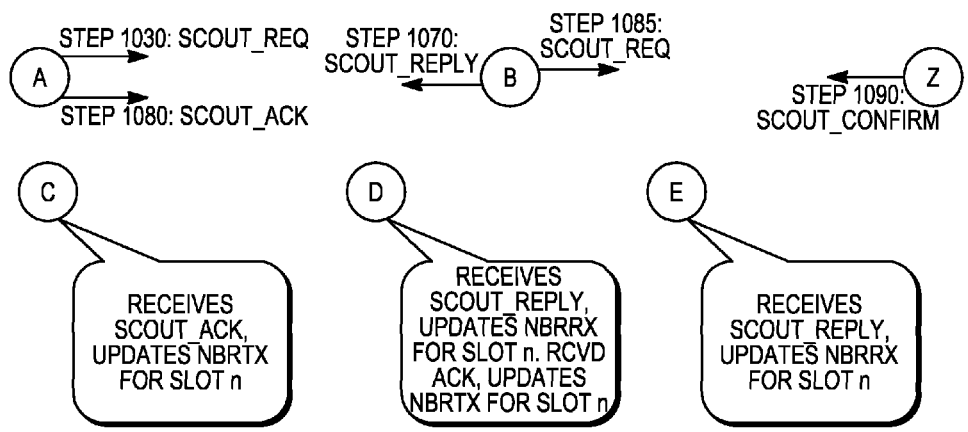

EXAMPLE OF SCOUT MESSAGE EXCHANGE DURING SLOT ALLOCATION PROCESS

*FIG. 10*

SYSTEMS, METHODS AND APPARATUS FOR DETECTING TIME SLOT INTERFERENCE AND RECOVERING FROM TIME SLOT INTERFERENCE IN AN AD HOC WIRELESS COMMUNICATION NETWORK

RELATED APPLICATIONS

The present application is related to the following which are each commonly owned with this application by Motorola, Inc.: U.S. Pat. No. 7,561,542, granted Jul. 14, 2009, titled "Method And Apparatus For Determining If Data From A Source Has Arrived Properly At A Destination In A Time Division Multiplex (TDM) Communication Network;" and United States Application Publication Number US20070274320A1, published Nov. 29, 2007, titled "Methods And Apparatus For Allocating Time Slots In An Ad Hoc Wireless Communication Network," the entire contents of each being incorporated herein by reference.

FIELD OF THE INVENTION

The present invention relates generally to wireless communications and more particularly to time slot interference in ad hoc wireless communication networks.

BACKGROUND

Types of wireless networks include infrastructure-based wireless networks and ad hoc wireless networks.

Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node should maintain routing information collected through conversation with neighboring nodes. The routing information can also be periodically broadcast in the network to reflect the current network topology. Alternatively, to reduce the amount of information transmitted for maintaining accurate routing information, the network nodes may exchange routing information only when it is needed. In an approach known as Mesh Scalable Routing (MSR), described in U.S. Patent Application 20040143842 which is incorporated by reference herein in its entirety.

One access scheme for ad hoc networks is Time Division Multiple Access (TDMA), in which the transmission resource of a radio frequency is divided into time slots, and a unit may transmit in one or several time slots. This allows multiple user to share the same transmission medium (e.g. radio frequency) while using only part of its bandwidth. TDMA scheme is commonly used in digital cellular standards, satellite systems and local area networks. It is known that TDMA scheme works well for periodic and time sensitive traffic than Carrier Sense Multiple Access (CSMA). Most of the commonly used TDMA system works with centralized time slot allocation. For example, in cellular system, base station is central authority whereas in local area network, access point is the central node, which is responsible for allocation time slots for communication for all the attached nodes.

Centralized allocation of timeslots requires exchanging a large amount of network management information, which consumes valuable communication bandwidth. Centralized timeslot allocation techniques are typically applied in networks where the length of the communication path is relatively small (e.g., only one hop). Applying centralized timeslot allocation techniques in multi-hopping networks can be problematic because the of the significant amount of time required for propagating information from nodes at the periphery of the network to a central node, and for propagating information from the central node back to the nodes at the periphery of the network. Centralized timeslot allocation techniques are inefficient for reaching all network nodes due to mobility of nodes and the relatively long time needed for propagating the information to each node in the network. For this reason, in mobile multi-hopping networks, where the topology of nodes changes frequently, the utilization of centralized timeslot allocation techniques is prohibitive.

There can be multiple routes present between the nodes, but not all routes can support the quality of service (QoS) requirements of a particular data stream, this is especially true in systems employing TDMA Media Access Control (MAC) as routes may not even have sufficient slots to sustain the data stream. And hence there is a need to find out such a route and allocate appropriate time slots in a distributed fashion which can meet the QoS requirements of the data stream.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3 is an exemplary table for the storage of information in a local communication map (LCM) according to one exemplary implementation;

FIG. 4 is a table showing field descriptions used in the LCM of FIG. 3 according to one exemplary implementation;

FIG. 5 is a table showing possible combinations of entries in LCM and how information in the local LCM is used to generate other useful maps according to one exemplary implementation;

FIG. 6 is a table showing an entry in a slot allocation table (SAT) according to one exemplary implementation;

FIG. 7 is a table showing information stored in a time slot utilization map (TSUM) according to one exemplary implementation;

FIG. 8 is a table showing how the local communication map (LCM) of FIG. 3 can be mapped to the time slot utilization map (TSUM) of FIG. 7 according to one exemplary implementation;

FIG. 9 is a table showing how the local communication map (LCM) of FIG. 3 can be mapped to a Transmission Possible Slot Map (TPSM) and a Reception Possible Slot Map (RPSM) according to one exemplary implementation; and FIG. 10 is a message flow diagram showing an exemplary scout message exchange during a slot allocation process in accordance with some embodiments of the invention;

Figure 1:
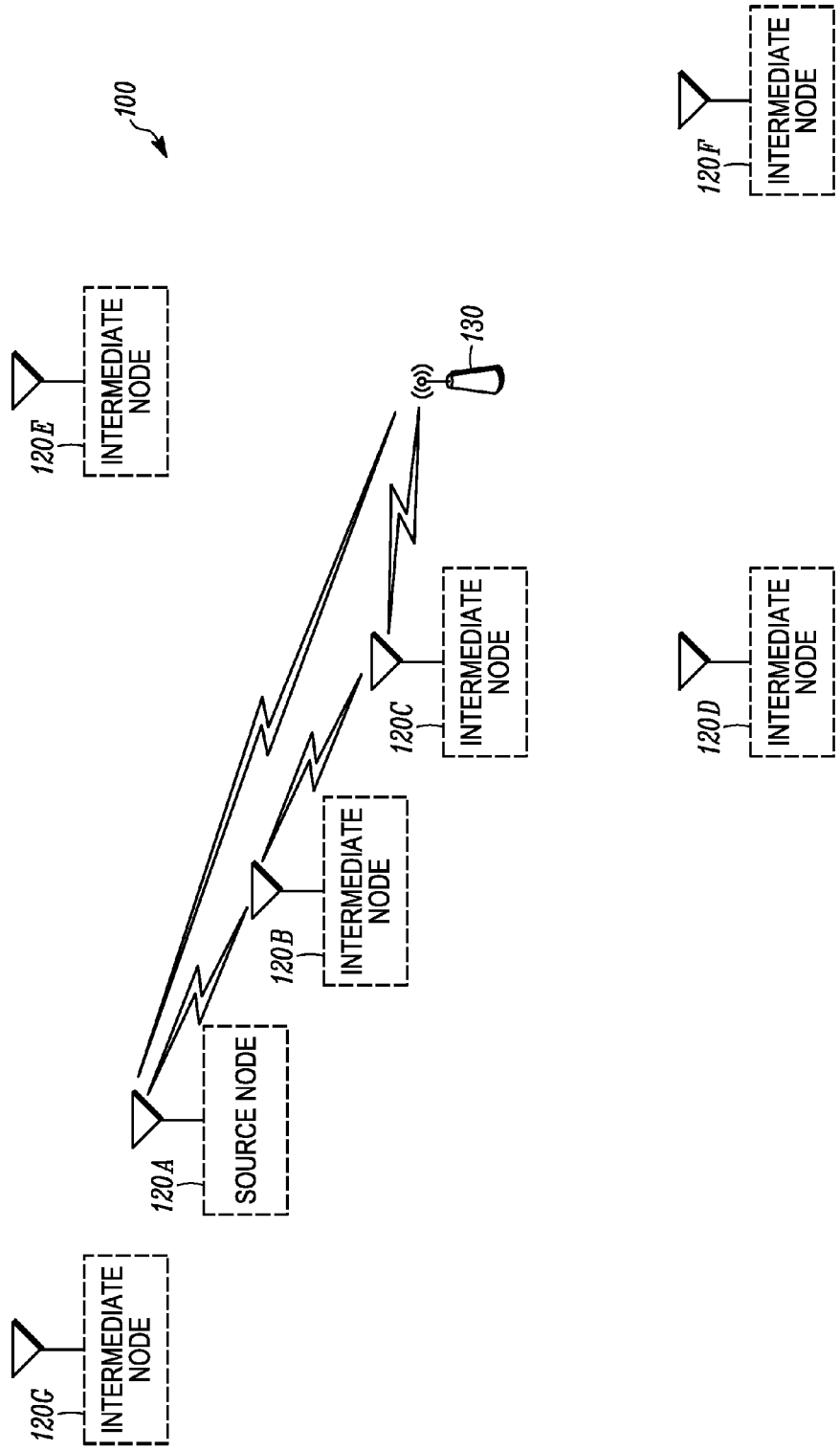
FIG. 1 is a block diagram of an exemplary ad hoc communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to allocating timeslots to nodes in an ad hoc network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for allocating timeslots to nodes in an ad hoc network as described herein. The non-processor circuits may include, but are not limited to, a radio receiver, a radio transmitter, signal drivers, clock circuits, power source circuits, and user input devices. As such, these functions may be interpreted as steps of a method for allocating timeslots to nodes in an ad hoc network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Exemplary Ad Hoc Multi-hopping Network

FIG. 1 is a block diagram of an exemplary ad hoc communication network 100 comprises a number of existing nodes 120 A-G.

The nodes 120A-120G typically support simultaneous operation in both infrastructureless mode and infrastructured mode and can move seamlessly between infrastructure-based networks (those including for example an Access Point AP 130) and client-based peer-to-peer networks which are free of any infrastructure.

The ad hoc multi-hopping communication network 100 can be created between a plurality of nodes 120A-120G each having wireless repeater and routing capability, and optionally a wired Access Point (AP) 130. Clients can move seamlessly between infrastructure-based networks and client-based peer-to-peer networks. It will be appreciated by those of ordinary skill in the art that while the ad hoc network 100 in FIG. 1 is shown as operating in an infrastructured mode (e.g., including APs and/or cellular base stations), the ad hoc network 100 of FIG. 1 does not require any network infrastructure to be present. Rather, the nodes 120A-120G typically support simultaneous operation in both infrastructureless mode and infrastructured mode.

In the ad hoc multi-hopping network 100, communications to and/or from nodes 120A-120G can "hop" through each other to reach other nodes 120A-120G in the network. The nodes 120A-120G can generally be wireless devices capable of receiving packetized audio, video and/or data information. Some of the components in an exemplary node, such as an exemplary processor, transmitter, receiver and antenna, are described below in FIG. 2. The nodes 120A-120G can exchange information as data packets transmitted over carrier frequencies, each of which includes one or more wireless communication channels.

In infrastructure mode, the access point AP 130 is typically coupled to a wired network (not shown) and can provide one or more sources of audio, video and/or data information. The access point AP 130 may be, for example, a cellular base station or other wireless access point.

Although not shown in FIG. 1, it will be appreciated by those of ordinary skill in the art that the nodes 120A-120G, can also communicate information packets with a cellular-based network (not shown) over wireless communication medium, each of which includes one or more wireless communication channels depending on the multiple access scheme utilized in the cellular-based network.

Each of the nodes 120A-G in the network is synchronized to a common clock. Synchronizing the clocks which control the transmission time and the unique assignment of timeslots can prevent the transmission of signals from more than one node at any particular time in any particular neighborhood. The nodes can be synchronized to this clock via a distributed synchronization technique, such as that described, for example, in U.S. Pat. No. 7,349,362, granted Mar. 25, 2008, entitled "Method And System For Implementing The Time Division Multiple Access Method To Ad Hoc Multihopping Wireless Networks", and owned by the owner/assignee of the present invention, which is incorporated herein by reference in its entirety.

Exemplary Node

Figure 2:
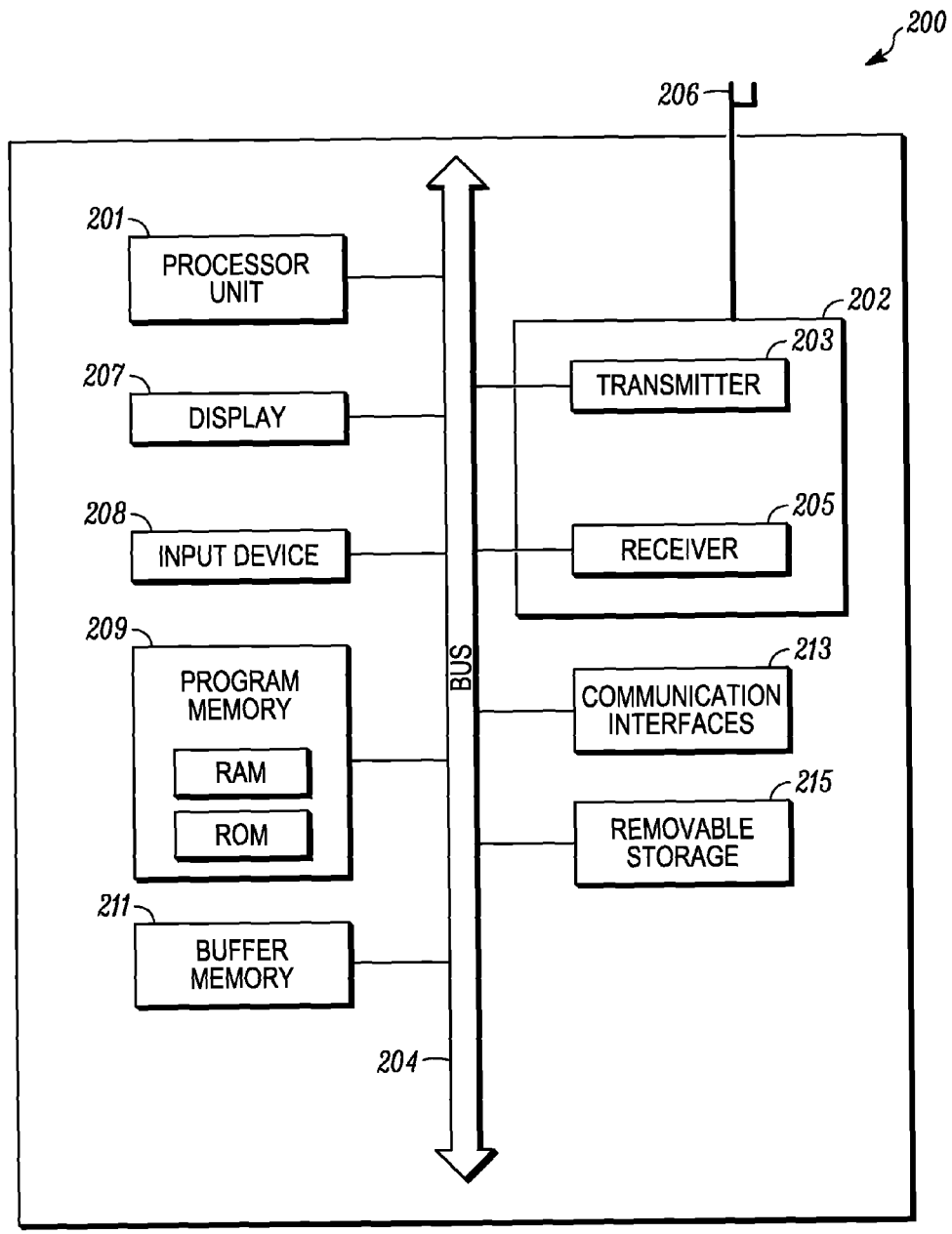
FIG. 2 is a block diagram of an exemplary node for use in the operation of some embodiments of the invention.

FIG. 2 is a block diagram of an exemplary node 200. The node 200 comprises a processor 201, a transceiver 202 including a transmitter circuitry 203 and a receiver circuitry 205, an antenna 206, a display 207, an input device 208, a program memory 209 for storing operating instructions that are executed by the processor 201, a buffer memory 211, one or more communication interfaces 213, and a removable storage unit 215. Although not shown, the node 200 also preferably includes an antenna switch, duplexer, circulator, or other highly isolative means (not shown) for intermittently providing information packets from the transmitter circuitry 203 to the antenna 206 and from the antenna 206 to the receiver circuitry 205. The node 200 is preferably an integrated unit containing at least all the elements depicted in FIG. 2, as well as any other elements necessary for the node 200 to perform its particular functions. Alternatively, the node 200 may comprise a collection of appropriately interconnected units or devices, wherein such units or devices perform functions that are equivalent to the functions performed by the elements of the node 200. For example, the node 200 may comprise a laptop computer and a wireless LAN (local area network) card.

The processor 201 preferably includes one or more microprocessors, microcontrollers, DSPs (digital signal processors), state machines, logic circuitry, or any other device or devices that process information based on operational or programming instructions. Such operational or programming instructions are preferably stored in the program memory 209. The program memory 209 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 209 containing the corresponding operational instructions may be embedded within the state machine or logic circuitry. The operations performed by the processor 201 and the rest of the node 200 are described in detail below.

The transmitter circuitry 203 and the receiver circuitry 205 enable the node 200 to communicate information packets to and acquire information packets from the other nodes. In this regard, the transmitter circuitry 203 and the receiver circuitry 205 include conventional circuitry to enable digital or analog transmissions over a wireless communication channel. The transmitter circuitry 203 and the receiver circuitry 205 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, 802.11 WLAN (wireless local area network), 802.16 WiMax, and the like)

The implementations of the transmitter circuitry 203 and the receiver circuitry 205 depend on the implementation of the node 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the node 200 or insertable into the node 200 (e.g., embodied in a wireless radio frequency (RF) modem implemented on a Personal Computer Memory Card International Association (PCMCIA) card). For a wireless communication device, the transmitter circuitry 203 and the receiver circuitry 205 are preferably implemented as part of the wireless device hardware and software architecture in accordance with known techniques. Most, if not all, of the functions of the transmitter circuitry 203 and/or the receiver circuitry 205 may be implemented in a processor, such as the processor 201. However, the processor 201, the transmitter circuitry 203, and the receiver circuitry 205 have been artificially partitioned herein to facilitate a better understanding.

The receiver circuitry 205 is capable of receiving RF signals from at least one bandwidth and optionally more bandwidths, if the communications with the proximate device are in a frequency band other than that of the network communications. The receiver circuitry 205 may optionally comprise a first receiver and a second receiver, or one receiver capable of receiving in two or more bandwidths. The transceiver 202 includes at least one set of transmitter circuitry 203. The at least one transmitter 203 may be capable of transmitting to multiple devices on multiple frequency bands. As with the receiver 205, dual transmitters 203 may optionally be employed where one transmitter is for the transmission to a proximate node or direct link establishment to WLAN's and the other transmitter is for transmission to a cellular base station.

The antenna 206 comprises any known or developed structure for radiating and receiving electromagnetic energy in the frequency range containing the wireless carrier frequencies.

The buffer memory 211 may be any form of volatile memory, such as RAM, and is used for temporarily storing received information packets in accordance with the present invention.

When the node 200 is constructed to receive video information from a video source, the node 200 preferably further includes a video decoder capable of decoding the current Moving Picture Experts Group (MPEG) standard or some other video decoding standard. When the node 200 is further capable of transmitting video information, the node 200 preferably further includes a video encoder capable of encoding the video data into at least one of the foregoing video standards. Such video encoder and decoder is preferably implemented as part of the processor 201.

Exemplary Time Slot Management Techniques

A frame structure is provided which divides the time of transmission into super frames which are further divided into frames. The multi-level framing structure supports different time bases for sub-channels. The lower level frame timing provides a rapidly recurring time base to support data transmission. The higher level framing is based on the lower level framing, and provides a less frequently recurring time base for a hello channel. The hello channel is defined using the multi-level framing structure. A portion of each lower level frame is allocated as slots, and these slots are numbered and assigned using the higher level framing. Enough slots are allocated for the desired number of nodes in a neighborhood. The slots can be positioned in any part of the frame, and can be apart from each other, but their position is known to all the nodes in the network. The slot positioning can be preconfigured in all the nodes or can be a parameter which can be learned by the nodes.

Techniques and technologies are provided for scheduling of time slots in a distributed manner without the help of a central scheduler. Scheduling techniques use routing information provided by a routing protocol to find out route(s) which can support the QoS requirements of the data stream. The scheduling process works with any routing protocol, and is particularly useful with routing protocols which can provide multiple routes to a destination node. Scheduling of time slots involves allocation of slots, maintenance of allocated slots, and de-allocation of slots. Slots are allocated for each data stream. In one implementation, data streams are uniquely identified by stream number which is a tuple <MAC address of source, MAC address of destination, Stream ID>. These can be real MAC addresses or short hand addresses.

Once the allocated slots are not being used to transfer data the allocated slots can be freed so that other nodes can reuse them effectively. The allocation of slots is done such that the QoS requirement of the data stream can be maintained over multiple hops. Slot allocation is performed to maximize spatial reuse; this involves timely notification of allocation to the neighborhood, such that distant nodes can re-use the time slots. After initial time slot allocation, the allocated time slots may start experiencing interference due, for example, to mobility of nodes. Appropriate mechanisms are needed to detect time slot interference and resolve the same. After a change or changes in route to the destination node, techniques for reallocating time slots are also needed. Allocated time slots should be freed ("de-allocation of slots") once they are not being used to transfer data so that other nodes can reuse those time slots.

Slot Information Data Structures

Local Communication Map

Nodes in the network maintain a Local Communication Map (LCM) which stores the information about each of the time slots. The LCM is updated by a node upon receiving a hello message or scouting messages.

FIG. 3 is a table showing the structure of information stored in a local communication map (LCM) according to one exemplary implementation. FIG. 4 is a table 400 showing field descriptions used in the LCM of FIG. 3 according to one exemplary implementation. The table 400 includes a time slot number field (Time Slot # field), a self transmit field (Self Tx field), a self receive field (Self Rx field), a neighbor transmit field (Nbr Tx field), a neighbor receive field (Nbr Rx Field), a neighbor transmit list field (NbrTx List field), and a neighbor receive list field (NbrRx List Field).

The Time Slot # field specifies the time slot number relative to the start of frame. The number of entries in LCM will be equal to the number of time slots in a frame. The Self Tx field comprises a one bit value signifying whether the node itself is transmitting on this time slot or not (e.g., 1—Transmitting, 0—Not Transmitting). The Self Rx field comprises a one bit value signifying whether the node itself is receiving on this time frame or not (e.g., 1—Receiving, 0—Not Receiving). The Nbr Tx field comprises a one bit value signifying whether one of the neighbors of the node is transmitting or not (e.g., 1—Transmitting, 0—Not Transmitting). The Nbr Rx Field comprises a one bit value signifying whether one of the neighbors of the node is receiving on this time slot or not (e.g., 1—Receiving, 0—Not Receiving). The NbrTx List field points to a link list of all the neighbors that are currently transmitting on this slot. The NbrRx List Field points to a link list of all the neighbors that are currently receiving on this slot.

FIG. 5 is a table 500 showing possible combinations of entries in LCM and how information in the local LCM is used to generate other useful maps according to one exemplary implementation. Preliminarily, it should be noted that although there are 16 possible ways in which this table can be filled with ones and zeroes, there are only eight valid cases since some cases, such as SelfTx and SelfRx simultaneously being 1, are considered invalid. The entries in LCM table (SelfTx, SelfRx, NbrTx, and NbrRx) are populated while exchanging scouting messages. This is described in detail below.

In table 500, the symbol → points to a link list of all the neighbors who have indicated that they are transmitting on this time slot. The value 1 will be changed to 0 only if all these neighbors have indicated otherwise. The symbol → points to a link list of all the neighbors who have indicated that they are receiving on this time slot. The value 1 will be changed to 0 only if all these neighbors have indicated otherwise.

In case 1, the current node has no information about any transmission or reception in the neighborhood and the current node is neither transmitting nor receiving. In case 2, one or more of the neighbors have indicated that they are receiving on this time slot. Since none of the neighboring node has indicated about transmission, the transmitter node must be a two hop neighbor. In case 3, one or more of the neighbors have indicated that they are transmitting on this time slot. Since none of the neighboring nodes have indicated about reception, the receiver node must be a two hop neighbor. In case 4, one or more of the neighbors have indicated that they are transmitting and one or more of the neighbors have indicated that they are receiving. The transmission and reception indicated can be same or independent of each other. In case 5, the current node is receiving in the time slot. The current node can receive only from one of its neighbors and hence the Nbr Tx field is always marked 1 when the current node is receiving. In case 6, the current node is receiving in the time slot. The current node can receive only from one of its neighbors and hence the value 1 in Nbr Tx field. One of the neighbors has also indicated that it is receiving in this time slot. One possibility is a multicast transmission and other possibility is the following scenario:

(Scenario 1)

where current node B is receiving from neighbor A while neighbor C is receiving from node D.

In case 7, the current node is transmitting and one of its neighbors is receiving. A node will make entry in the LCM about its transmission only after exchanging scouting messages with its neighbor and hence can mark the particular neighbor as a receiving node in that slot. Hence the Nbr Rx field is always marked 1 when the current node is transmitting. In case 8, the current node is transmitting to one of its neighbors (hence 1 bit in the Nbr Rx) and one of the other neighbors is also transmitting. This is possible in the following scenario:

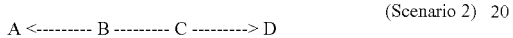

(Scenario 2)

where B is the current node and is transmitting to node A, C is B's neighbor but it is transmitting to node D.

FIG. 6 is a table showing an entry in a slot allocation table (SAT) according to one exemplary implementation. Scheduling uses stream numbers to uniquely identify a data stream between a source node and a destination node. Each allocation or reservation of time slots can be identified by a unique stream number at all the nodes concerned. To guarantee the uniqueness of the stream number, the stream number is controlled by the originator of data. For example, a stream can be identified with the couple <MAC address of the source node, Stream ID> where the Stream ID is an integer incremented by the source node every time it starts a new data stream. Each node maintains the data slot allocation for various streams in a Slot Allocation Table (SAT).

As shown in FIG. 6, entries in the SAT may comprise, for example: a stream number entry (Strm # entry) which uniquely identifies the data stream between a source and destination node, a source address (Src Addr) entry which identifies the source MAC address of the data stream, a destination address (Dest Addr entry) which identifies the destination MAC address of the data stream, a Data Slot Allocated entry which identifies the slot(s) allocated for data transmission by this node, an Exp Time entry which identifies a threshold time before slot is freed (refreshed with each packet transmission on this slot), a previous hop (Prev Hop) entry which identifies the previous hop MAC address from where data will be received (this is invalid for source node), a Next Hop entry which identifies the next hop MAC address to which data will be sent (this is invalid for destination node), a Data Buffer entry which identifies a buffer to store data packets while scheduling is in progress, a self receive slot (SelfRx Slot) entry which identifies the slot at which this node is receiving packets from previous hop, a Data Rate entry which identifies the data rate requirement for the data stream, and a Delay entry which identifies the total delay incurred so far by the data stream.

Information in Hello Message

A hello message is transmitted by all the nodes on a periodic basis and it can have a dedicated slot as explained, for example, in a system such as that disclosed in U.S. Patent Application Publication No. US20070211686A, entitled "System, Method And Apparatus For Reliable Exchange Of Information Between Nodes Of A Multi-Hop Wireless Communication Network" published Sep. 13, 2007 and assigned to the assignee of the present invention, its contents being incorporated by reference in its entirety herein. The hello message contains a Time Slot Utilization Map (TSUM) along with other information. The TSUM is built from the information stored in the local LCM as described below.

FIG. 7 is a table showing a time slot utilization map (TSUM) according to one exemplary implementation. In this implementation, the TSUM includes a value comprising two bits of information about each of the time slots. The value describes the status of the corresponding slot. Different values in the TSUM will now be described.

With respect to the value "00," case 1 is straight forward as the current node has no information about any ongoing transmission or reception. Case 2 can be described via the following example:

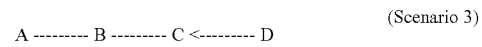

(Scenario 3)

wherein node B is the current node and neighbor node C is receiving on the time slot from node D. For node A this time slot is free as it can transmit to B as well as other neighbors subjected to their status. With respect to the value "01," in both cases 7 and 8 the current node is transmitting (which is the overriding condition here irrespective of the status of neighbors). With respect to the value "10," in both cases 5 and 6 the current node is receiving (which is the overriding condition here irrespective of the status of neighbors). With respect to the value "01," in both cases 3 and 4 one of the current node's neighbors is transmitting (which is the overriding condition here irrespective of the status of other neighbors).

Transmission Possible Slot Map (TPSM) and Reception Possible Slot Map (RPSM)

A node also maintains a Transmission Possible Slot Map (TPSM) and a Reception Possible Slot Map (RPSM) which are used in scouting messages to decide on the slots on which communication will take place. The TPSM and RPSM can be derived from the LCM using the following table.

FIG. 8 is a table showing how the local communication map (LCM) of FIG. 3 can be mapped to the time slot utilization map (TSUM) of FIG. 7 according to one exemplary implementation. FIG. 9 is a table showing how the local communication map (LCM) of FIG. 3 can be mapped to a Transmission Possible Slot Map (TPSM) and a Reception Possible Slot Map (RPSM) according to one exemplary implementation. The TPSM and RPSM values will now be explained.

In case 1, the current node is free to receive and transmit since the current node has no information about any transmission or reception in the neighborhood and the current node is neither transmitting nor receiving. In case 2 one or more of the neighbors are receiving on this slot and any transmission from the current node can interfere with the reception; hence TPSM is 0. Since none of the neighbors have indicated transmission, the transmitter must be two hops away and the current node is free to receive from some other neighbor; hence RPSM is 1. Alternatively, in the following example:

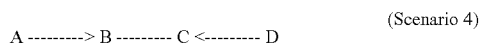

(Scenario 4)

node B is current node and its neighbor C has indicated a reception. Node B is still free to receive from A.

In case 3, one or more of the neighbors are transmitting on this time slot. As such, the current node cannot receive on the same slot due to interference (RPSM=0) but it can transmit to some other neighbor. Alternatively, in the following example, where node B is current node and its neighbor node C is transmitting to node D, $$A <\text{---------} B \text{---------} C \text{---------}> D \quad \text{(Scenario 5)}$$

where node B can still transmit to neighbor node A without interfering with any ongoing transmissions.

In case 4, one or more of the neighbors have indicated that they are transmitting (hence can not receive) and one or more of the neighbors have indicated that they are receiving (hence can not receive). In case 5, the current node is receiving in the time slot, it can only receive one transmission at a time and can not transmit while receiving. In case 6, the current node is receiving in the time slot, and therefore the current node can only receive one transmission at a time and can not transmit while receiving (this condition overrides the condition of reception by the neighbor node). In case 7, the current node is transmitting and can transmit only one stream at a time (TPSM=0). The current node can not receive and transmit at the same time (RPSM=0). In case 8, the current node is transmitting and can transmit only one stream at a time (TPSM=0). The current node can not receive and transmit at the same time (RPSM=0) (this condition overrides the condition of transmission by another neighbor).

Allocation, De-allocation and Maintenance of Slots

When a node needs to communicate with any other node in the network, it indicates its desire to do so to a routing module in the node. The routing module provides at least one route to the destination but will not guarantee the availability of slots. To determine if the given route has enough slots to accommodate the QoS requirements of the traffic, the node needs to scout the route for slots. To scout a route, the source node initiates a slot allocation process and sends out scouting messages for slot allocation.

A scout message may comprise one of a Scout Request message, a Scout Reply message, a Scout Ack message, a Scout Confirmation message, and a Scout Error message. It should also be appreciated that the Scout Error message can be sent whenever an intermediate node finds that it cannot meet the QoS requirements of the data stream or when current slot allocation expires. A detailed explanation of each message will now be provided with reference to FIG. 10.

FIG. 10 is a message flow diagram showing an exemplary scout message exchange during a slot allocation process in accordance with some embodiments of the invention.

According to one technique, at step 1030, the source node A sends a Scout Request message towards destination node Z that contains the map of the slots which are available for transmission. The first intermediate node B (next hop) compares this with the slots on which it can receive and picks the appropriate slots.

Scout Request

As mentioned above, each node maintains a list of slots that are available for transmission and reception which are referred to above as a Transmission Possible Slot Map (TPSM) and a Reception Possible Slot Map (RPSM).

The source node initiates scheduling by sending a Scout Request message to the next hop towards the destination (as per routing table) when a data packet is received at a source node from application layer and there is no "Data Slot Allocated" for this stream number in the Slot Allocation Table. The Scout Request message contains the TPSM (e.g., the map of the slots which are available on the source node) derived from the LCM table. The Scout Request message may be a unicast packet.

Generating Scout Request message

When generating the Scout Request message, the source node will provide the following information in Scout Request message: a stream number, a source MAC Address, a destination MAC Address, a minimum data rate, and a maximum delay.

The stream number can be used to reserve the slots. The source MAC address is the MAC address of the node initiating the Scout Request message. The destination MAC address is the MAC address of the final destination of the data stream for which time slots need to be reserved. The minimum data rate is the data rate which needs to be maintained at all the intermediate nodes to satisfy the QoS requirement of this particular data stream. (This value can be transmitted as it is or can be converted into number of time slots required per frame at a given data rate). The maximum delay is the maximum delay which packets of this data stream can sustain while traversing along the route and still maintaining the QoS requirement. (This value can be transmitted as it is or can be converted into number of frames or slots)

The information listed above is preserved in the Scout Request message and will be forwarded as it is by the intermediate nodes. The source node will also include the TPSM of the source node (e.g., the source node will include the Transmission Possible Slot Map for itself), the data rate of the source node, and the delay incurred so far. The data rate of the current node specifies the data rate which will be used by it to communicate with the next hop. (This value can be transmitted as it is or can be converted into number of time slots per frame which will be occupied by source node to adhere to the QoS requirement). The delay incurred so far field is initialized to zero by the source node and is updated by all the intermediate nodes to reflect the total delay a data frame will incur in reaching the current node if the current route is selected.

The information in the Scout Request message can then be modified by each intermediate node before forwarding to the next hop.

The node generating the Scout Request message can then create an entry for the stream number in Slot Allocation Table. The "Data Slot Allocated" field will be kept invalid and will be populated upon reception of Scout Reply message.

Processing a Scout Request Message

The Scout Request message is a directed message and is processed only by the node for which it is destined; others simply discard it. The node processing the Scout Request message first checks to determine if the Scout Request message meets the requirements of the data stream. To do so, in one implementation, the Scout Request message goes through the following checks. The destination node first compares the TPSM map sent by the previous hop with the local Reception Possible Slot Map (RPSM) to determine if it can receive on the time slot (or slots depending on the data rate) which is/are indicated free in TPSM. If the destination node finds common slot (or slots) in the TPSM and RPSM map, it will then check if the QoS and total delay requirements are met for this data stream. Techniques for checking if the QoS and total delay requirements can be met are described in detail below. If QoS and total delay requirements can not be met, a Scout Error message will be sent as described below.

If the QoS requirements are met a Scout Reply message is being sent and the Scout Request message will be forwarded to the next hop towards the destination. Before forwarding the Scout Request message, a number of fields are updated in the Scout Request message. For example, the intermediate node appends its modified TPSM, updates the data rate of current node field to reflect the date rate between itself and the next hop towards the destination, and updates the delay incurred so far (which is calculated based on the time slot proposed by it to the previous node in the Scout Reply message).

Scout Reply message

At step 1070, the next hop node B also indicates the selected slots in a Scout Reply message. A node generates a Scout Reply message and sends it to the previous hop when an intermediate node can find necessary slots which are common in TPSM of a previous node and its own RPSM, and the delay incurred so far is lower than the maximum allowable delay. A Scout Reply message is a unicast message (e.g., not forwarded by the receiving node) which has the information about the slot(s) which have been picked by the intermediate node to receive data. A Scout Reply message can include a stream number and a slot allocated field. The stream number uniquely identifies the source, destination pair traffic. The slots allocated field indicates slot number(s) selected for reception by next hop (or transmission for previous hop). The node generating the Scout Reply message adds an entry in the SAT for this stream number and populates SelfRx Slot, Previous hop and Expiry time fields. The node generating the Scout Reply marks SelfRx=1 in its LCM table for the selected slot(s). All the nodes that hear a Scout Reply message (previous hop node and neighbor nodes, for which this message was not intended), update their LCM table by making NbrRx=1 (if not already 1) and add the Scout Reply originator node in the NbrRx List (if not already present). The previous hop node, after receiving Scout Reply message, adds the slots allocated for transmission in the Slot Allocation Table (SAT) and broadcast a scout acknowledgement (Scout Ack) message.

Scout Ack message

At step 1080, the source node A announces the picked slots in a Scout Ack message. The scout acknowledgement (Scout Ack) message is generated after receiving and processing Scout Reply message. Scout Ack transmission allows neighbor nodes to update the slot status in their local LCM tables. The Scout Ack message contains the slot number(s) that this node will be using for transmission. The Scout Ack message contains a stream number field which uniquely identifies the source, destination pair traffic, and a slots allocated filed which specifies the slot number(s) selected for transmission. The Scout Ack message is a broadcast message and is not forwarded further. The node generating the Scout Ack message will update its SelfTx=1 in its LCM table for the allocated slot(s). Nodes receiving the Scout Ack message use it to update their LCM table by making NbrTx=1 (if not already 1) and add the originator in NbrTx List (if not already present).

This three way message exchange (Scout Request, Scout Reply and Scout Ack) completes the slot allocation at the source node A. This exchange also allows the neighboring nodes to update the LCM table according to the slots selected. The process (steps 1030, 1070, 1080) is repeated at all the intermediate nodes.

Scout Confirmation Message

At step 1090, the destination node Z sends a Scout Confirmation message which marks the completion of end-to-end allocation. A scout confirmation message is a unicast message sent by destination node to its previous hop if all the intermediate nodes, including the node itself, have necessary slots to meet the QoS requirement of the data stream. The scout confirmation message is forwarded to the next hop towards the source node but without the field containing the slot number (the slot number/numbers field is used only the destination node to save one Scout Reply message). The Scout confirmation message includes the slot number (or slot numbers) on which it will receive the data from the previous hop. The node generating scout confirmation message updates its SelfRx=1 for the allocated slot(s) in its LCM table. All nodes (previous hop and other neighbor nodes for which message was not intended) that hear scout confirmation message, update their LCM table by making NbrRx=1 (if not already 1) and adding originator node in NbrRx List (if not already present).

Scout Error

A Scout Error message is generated in a number of different cases. For example, a Scout Error message is generated if none or an insufficient number of common slots are found between the TPSM of transmitting node and RPSM of receiving node. A Scout Error message is also generated if the total delay incurred is more than the maximum allowed for the data stream. A Scout Error message is also generated when a Slot Table Entry expires. The Scout Error message is generated by the node which detects any of the above condition (Error Detecting Node). All nodes receiving the Scout Error message reset the slot(s) status in the LCM to be free which were reserved for the particular stream number indicated in the message. The Scout Error message can be sent with broadcast or unicast address. The Scout Error message contains a valid or an invalid slot number, the stream number, slot number(s) and error type fields.

When a node fails to allocate a time slot or total delay increases the maximum delay during slot allocation process, it sends out a unicast reverse Scout Error message (for previous hop toward source node) with slot number Invalid. The previous hop node will process it by removing the scout table entry for this stream number and freeing up the slot. It will then forward the Scout Error message in the direction towards source node. When this Scout Error message reaches source node, it will broadcast a Scout Error message to tell neighbors about the slot its going to free.

Each slot allocation has an expiry time. With each data packet transmission/reception, the expiry timer is refreshed. If the slot is not used for certain period of time, it is considered unused and needs to be freed. In case of slot expiry, the node broadcasts a Scout Error message by listing expired slot(s). This Scout Error message is processed by all the neighbor nodes and not forwarded further. Neighbor nodes free the slot(s) indicated in the Scout Error message.

Exemplary Time Slot Allocation Method

Figure 11:
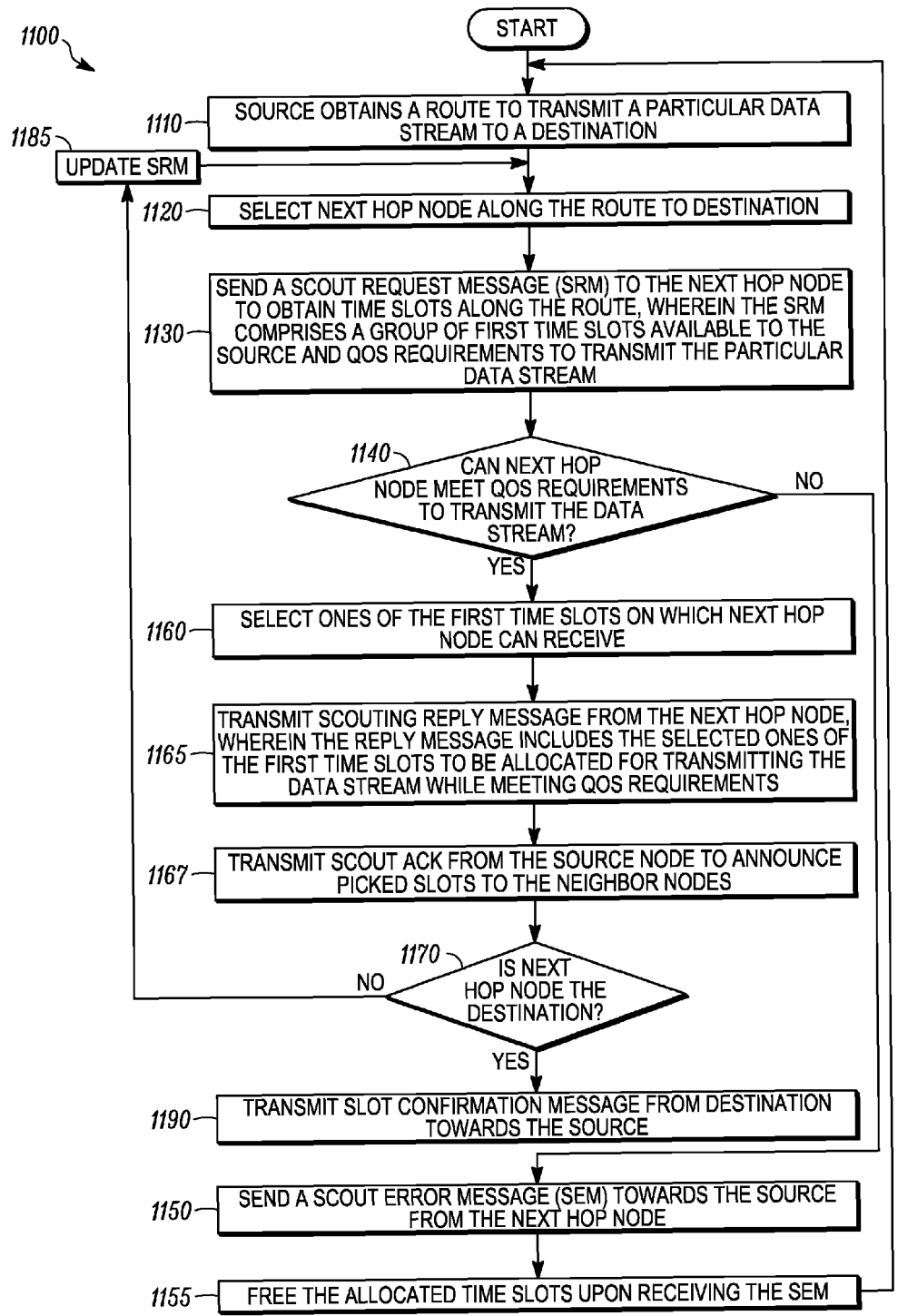
FIG. 11 is a flowchart showing an exemplary method for determining time slot allocation along a route for a communication between a source node and a destination node in an ad hoc multi-hopping network in accordance with some embodiments of the invention.

FIG. 11 is a flowchart showing an exemplary method 1100 for determining time slot allocation along a route for a communication between a source node and a destination node in an ad hoc multi-hopping network in accordance with some embodiments of the invention. The route may comprise (but does not necessarily need to include) at least one intermediate node along the route between the source node and the destination node.

At step 1110, when the source node attempts to communicate a given data stream to a destination node in the network, a routing module provides a route to the destination node but will not guarantee the availability of slots. To find if the given route has enough slots to accommodate the QoS requirements of the particular data stream, the node scouts the route for slots. For example, after receiving the route (the next hop) from the routing module for the desired destination node, at step 1120, the source node selects the next hop node along the route.

At step 1130, the source node generates and sends a Scout Request Message (SRM) to the next hop node towards the destination. The SRM contains the map of the slots which are available on the source node. The source node sends the SRM to the next hop node to request that the next hop node allocate time slots for transmitting a particular data stream. The SRM may comprise a packet which comprises a stream number, a source MAC address, a destination MAC address, and QoS requirements to transmit the particular data stream.

The stream number can be used to reserve the slots. The source MAC address is the MAC address of the node initiating the Scout Request packet. The destination MAC address is the MAC address of the final destination of the data stream for which time slots need to be reserved. The QoS requirements may comprise, for example, at least one of a plurality of fields for the data stream. The plurality of fields may comprise, for example, a minimum data rate field, a maximum delay field, a jitter field and a total delay incurred field. The minimum data rate field comprises the data rate which needs to be maintained at the intermediate nodes to satisfy the QoS requirement of the particular data stream. This value can be transmitted as it is (e.g., in kbps) or can be converted into number of time slots required per frame at a given data rate. The maximum delay field comprises the maximum delay which packets of this data stream can sustain while traversing along the route and still maintaining the QoS requirement. This value can be transmitted as it is (e.g., in milliseconds) or can be converted into number of frames or slots. The total delay incurred field indicates a total delay incurred (so far), and can be updated at every intermediate node.

The SRM may also comprise information such as the Transmission Possible Slot Map (TPSM) for the current node, data rate of current node (e.g., data rate which will be used by it to communicate with the next hop) and delay incurred so far. (This value can be transmitted as it is or can be converted into number of time slots per frame which will be occupied by source node to adhere to the QoS requirement). The delay incurred so far can be initialized to zero by the source node and will be updated by all the intermediate nodes to reflect the total delay a data frame will incur in reaching the current node if the current route is selected.

The SRM will be forwarded as it is by the intermediate nodes, and can be modified by each intermediate node before forwarding to the next hop.

At step 1140, upon receiving the SRM, the next hop node determines if it can allocate time slots such that it can meet the QoS requirements for transmitting the particular data stream. The next hop node can make this determination based on an analysis of at least one of the fields in the SRM. For example, the next hop node can make this determination by performing any of a number of checks which are described below.

If the next hop node determines that it can not allocate time slots such that QoS requirements for transmitting the particular data stream can be satisfied, then at step 1150, the next hop node can transmit a Scouting Error Message (SEM) towards the source node. For example, the next hop node can generate the SEM if (a) an insufficient number of common slots are found between the TPSM of transmitting node and RPSM of receiving node, or (b) the total delay incurred is more than the maximum delay requirement allowed for the data stream. The error detecting node unicasts the Scout Error message to the next hop towards the source node. The SEM can include a "scouting_failed" flag enabled. The source node then needs to send a new Scout Request message along a different route (if present). At step 1155, each node which receives the SEM from the next hop node can reset the status of the slots (indicated in the SEM as being reserved for the particular stream number) in the LCM as being "free."

If the next hop node determines that it can allocate time slots such that QoS requirements for transmitting the particular data stream can be satisfied, then at step 1160, the next hop node (e.g., the first intermediate node) compares slots on which it can receive with slots specified in the SRM (as being available to the source node), and can then select or pick appropriate slot(s) to allocate for transmitting the particular data stream. For example, in a linear network comprising the nodes A-D, where node A is the source node and node D is the destination node, if the data rate between node B and node C is X Mb per second, and the data rate between node C and node D is 2×Mb per second, then node B would require twice the number of time slots as node C.

If all the "checks" are successful (e.g., the QoS requirements can be met by the next hop node), then at step 1165, the next hop node can generate and transmit a scouting reply message, for example, when the next hop node (or other intermediate node) determines slot(s) which are common in TPSM of previous node and its own RPSM, and the delay incurred so far is lower than the maximum allowable specified in the SRM. The Scout Reply message includes the selected time slots designated for transmitting the particular data stream. The Scout Reply message can be a unicast message sent to the previous hop and is not forwarded by the receiving node. It has the information about the slot(s) which have been picked by the intermediate node to receive data. Upon receiving the Scout Reply message, a node marks the Self Tx field of the corresponding slot in the LCM as 1 with a timer which will change the value back to 0 if a Scout Confirmation message is not received within SCOUT_TIMEOUT period. The SRM can also be forwarded to the next hop towards the destination node.

At step 1167, the source node (which earlier sent the Scout Request message upon receiving a Scout Reply message transmits a Scout Ack message to announce the picked slots to neighbor nodes in its transmission range. The Scout Ack message contains data stream number and slot(s) picked for transmission. It announces the selected slots so that neighbor nodes can update the slots status. This three way message exchange (Scout Request, Scout Reply and Scout Ack) between a pair of nodes completes the slot allocation between them. The process is repeated between all the nodes in the route.

At step 1170, the next hop node can determine whether it is the destination node.

If the next hop node determines it is not the destination node, then the process loops back to step 1120 where a new next hop node is selected. This loop allows the steps 1120-1185 to be repeated at each of the intermediate nodes until the destination node is reached. At step 1185, the next hop node can update the SRM, before forwarding the SRM. The updates the next hop node can make to the SRM may comprise, for example, appending its modified TPSM, updating the data rate of current node field to reflect the date rate between the next hop node and the new next hop towards the destination, updating the delay incurred so far field by including the delay which is calculated based on the time slot proposed by the previous node in the Scout Reply message, and adding the MAC address of the previous hop along with the time slot number in which it is scheduled to transmit.

Once it is determined that the next hop node is the destination node (Yes at step 1180), then at step 1190, the destination node can transmit a Scout Confirmation Message (SCM). The destination node sends the SCM if each of the intermediate nodes along the route, including the destination node, have necessary slots available to meet the QoS requirement of the data stream. The SCM can be a unicast message sent by the destination node to its previous hop. The SCM can include the slot number or slot numbers on which the destination node will receive the data from the previous hop. The previous hop, upon receiving the SCM, updates the LCM table. The SCM will then be forwarded to the next hop towards the source node, but without the field containing the slot number.

Figure 12:
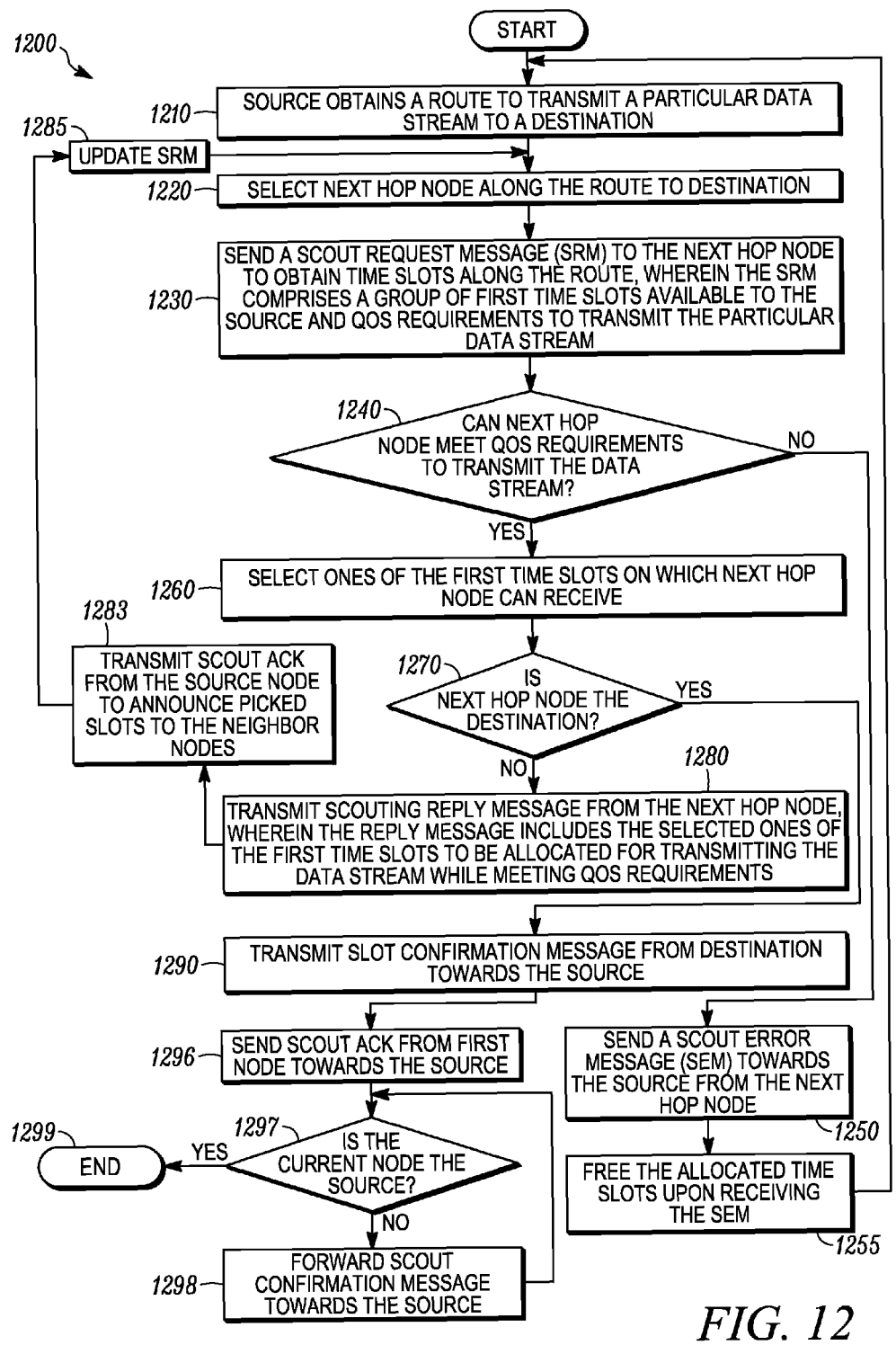
FIG. 12 is a flowchart showing another exemplary method for determining time slot allocation along a route for a communication between a source node and a destination node in an ad hoc multi-hopping network in accordance with some embodiments of the invention.

FIG. 12 is a flowchart showing an exemplary method 1200 for determining time slot allocation along a route for a communication between a source node and a destination node in an ad hoc multi-hopping network in accordance with some embodiments of the invention. The method 1200 is similar to that shown in FIG. 11, but reduces the number of Scout Reply message which will not be transmitted by destination node according to this embodiment.

In FIG. 12, steps 1210 through 1260 are the same as steps 1110 through 1160 in FIG. 11, and for sake of clarity will not be repeated again. If all the "checks" are successful at step 1240 (e.g., the QoS requirements can be met by the next hop node) and particular first time slots have been selected at step 1260, then at step 1270, the next hop node can determine whether it is the destination node.

If the next hop node determines that it is not the destination node, then at step 1280, the next hop node can generate and transmit a Scout Reply message. The next hop node (or other intermediate node) can determine time slot(s) which are common in TPSM of previous node and its own RPSM, and determine if the delay incurred so far is lower than the maximum allowable specified in the SRM, and if so, then the next hop node will send Scout Reply message to previous hop. Further information about the Scout Reply message is described above with reference to step 1165 of FIG. 11, and for sake of brevity will not be repeated again.

At step 1283, the source node broadcasts a Scout Ack message to announce the picked slots to its neighbor nodes. At step 1285, the next hop node can update the SRM, before forwarding the SRM. The updates the next hop node can make to the SRM may comprise, for example, appending its modified TPSM, updating the data rate of current node field to reflect the date rate between the next hop node and the new next hop towards the destination, updating the delay incurred so far field by including the delay which is calculated based on the time slot proposed by the previous node in the Scout Reply message, and adding the MAC address of the previous hop along with the time slot number in which it is scheduled to transmit. The process loops back to step 1220 where a new next hop node is selected. This loop allows the process 1220-1299 to be repeated at each of the intermediate nodes until the destination node is reached.

Once it is determined that the next hop node is the destination node (Yes at step 1280), then at step 1290, the destination node can transmit a Scout Confirmation Message (SCM), instead of Scout Reply message (sent out by intermediate nodes). Sending Scout Confirmation message in place of Scout Reply message by the destination node reduces the number of messages sent by one. In other words, when a node finds that it is the destination node, it will send Scout Confirmation in place of Scout Reply thus saving one Scout Reply message in contrast to FIG. 11 since in FIG. 11 each node, including the destination, sends a Scout Reply message, and destination will additionally send Scout Confirmation. The destination node sends the SCM if each of the intermediate nodes along the route, including the destination, has necessary slots available to meet the QoS requirement of the data stream. The SCM can be a unicast message sent by the destination node to its previous hop. The SCM can include the slot number or slot numbers on which the destination node will receive the data from the previous hop. The previous hop, upon receiving the SCM, updates the LCM table. The SCM will then be forwarded to the next hop towards the source node, but without the field containing the slot number. (The slot number/numbers field is used only by the destination node to save one Scout Reply message).

At step 1296, the first node towards source (previous hop) sends a Scout Ack to acknowledge SCM reception. At step 1297, the current node determines if it is the source node. If the current node is not the source node, then at step 1298, the current node forwards the Scout Confirmation Message towards the source node. In other words, the previous hop node sends the Scout Ack and forwards Scout Confirmation towards source. All other nodes will keep forwarding this Scout Confirmation towards source however they do not continue to send a Scout Ack. The process 1200 ends at step 1299.

If the current node is the source node, then scheduling is completed when Scout Confirmation reaches the source node and the process 1200 ends at step 1299.

Techniques For Determining If A Next Hop Node Can Meet QoS Requirements

As noted above at steps 1140 and 1240, the next hop node can determine if it can allocate time slots in a manner such that it can meet the QoS requirements for transmitting the particular data stream. The next hop node can make this determination based on an analysis of at least one of the fields in the SRM. Techniques will now be described by which a next hop node can determine, upon receiving a Scout Request Message, if the next hop node can meet the QoS requirements for transmitting a particular data stream.

When the next hop node receives a Scout Request message (SRM), the next hop node can then determine if the next hop node can meet the QoS requirements for transmitting the particular data stream by performing a set of checks as described below.

For example, the next hop node can compare the TPSM map sent by the previous hop to the local RPSM of the next hop node and determine if the next hop node can receive on time slot(s) which are indicated free in TPSM of the previous hop node. If the next hop node can determine common slot(s) in the TPSM of the previous hop node and RPSM of the next hop node, then the next hop node can perform the next check. Otherwise, the next hop node can transmit a Scout Error message (SEM).

At the next check, the next hop node can then compute the total delay which will be incurred if the slot(s) picked previously are indeed selected.

Next, the next hop node can determine if the total delay is less than the maximum delay indicated in the Scout Request message (SRM). If so, then next hop node will perform the next check. Otherwise, the intermediate next hop node will transmit a Scout Error message (SEM).

At the next check, the next hop node will then check if it is the final destination or an intermediate node.

If the next hop node is not the final destination, then the next hop node checks the data rate to the next, next hop towards the destination and also checks the local TPSM map (modified based on the slots already picked). Based on the checks, the next hop node can determine if its next hop has enough slots to meet the minimum data rate indicated in the Scout Request message (SRM). If the next hop node is not the final destination (i.e. an intermediate node), by checking modified TPSM map and data rate between itself and next hop towards destination, it can determine if it has enough slots left to support minimum data rate for its transmission to its next hop towards destination.

If enough slots are found to meet the requirement, then, the next hop node will send a Scout Reply message to the previous hop node as described above. Otherwise, the next hop node will transmit a Scout Error message (SEM).

Time Slot Interference

In some cases, two nodes can be allocated same time slots for transmission if their transmissions are not interfering (spatial reuse). Due to mobility, these nodes may later move into each other's transmission range causing interference, and data sent on this slot can collide and be lost at receiver. An example of how this can happen will be described with reference to FIG. 13.

Figure 13:
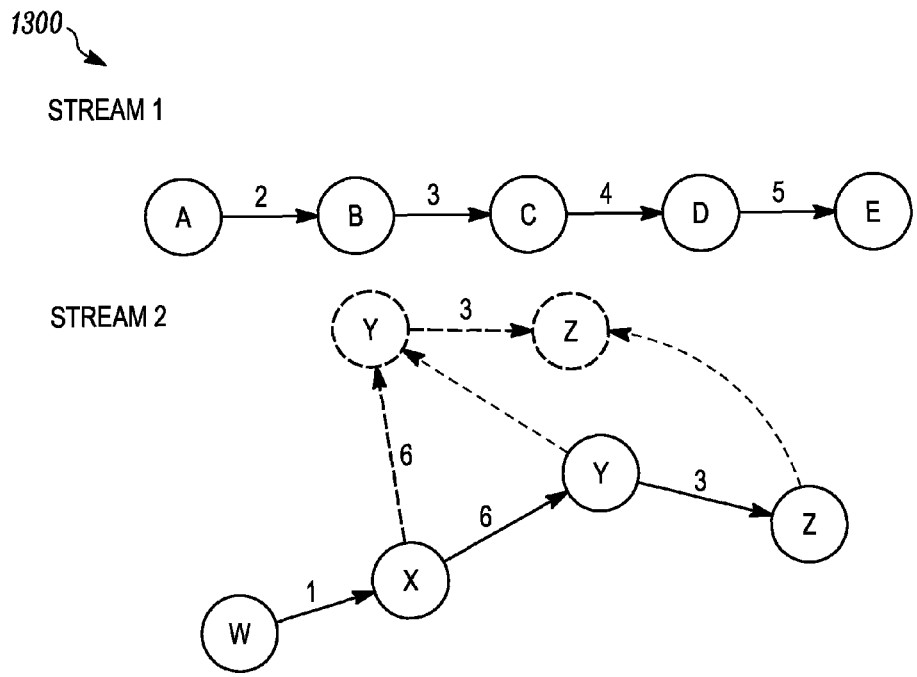
FIG. 13 is a message flow diagram showing an exemplary slot interference scenario.

FIG. 13 is a message flow diagram 1300 showing an exemplary slot interference scenario. To illustrate an exemplary slot interference scenario, FIG. 13 shows two routes carrying a first stream of data (STREAM 1) from a source node A to a destination node E, and a second stream of data (STREAM 2) from a source node W to a destination node Z.

The first route includes source node A, intermediate nodes B-D, and destination node E. The link between node A and node B uses slot 2 to carry the first data stream (STREAM 1), the link between node B and node C uses slot 3 to carry the first data stream (STREAM 1), the link between node C and node D uses slot 4 to carry the first data stream (STREAM 1), and the link between node D and node E uses slot 5 to carry the first data stream (STREAM 1). In FIG. 13, the nodes A-E carrying stream 1 and the nodes W-Z carrying stream 2 are initially both using Slot 3 (on the link between node B to node C, and on the link between node Y to node Z).

The second route includes source node W, intermediate nodes X, Y, and destination node Z. The link between node W and node X uses slot 1 to carry the second data stream (STREAM 2), the link between node X and node Y uses slot 6 to carry the second data stream (STREAM 2), and the link between node Y and node Z uses slot 3 to carry the second data stream (STREAM 2).

In FIG. 13, at a first time instant (where all nodes are represented using sold line circles), the nodes B and C carrying the first data stream (STREAM 1) and the nodes Y and Z carrying the second data stream (STREAM 2) are initially both using time slot 3 (on the link between node B to node C, and on the link between node Y to node Z). At the first time instant, the nodes A-E carrying stream 1 are out of the communication range of the nodes W-Z carrying stream 2. Since the nodes A-E carrying stream 1 are out of the communication range of the nodes W-Z carrying stream 2, this allocation scheme works well (e.g., there are no slot interference issues).

However, at the second time instant (wherein nodes Y and Z are represented using dashed line circles), the nodes Y, Z (carrying the second data stream (STREAM 2)) relocate (as indicated by the dotted line arrows) such that nodes Y, Z are now within the communication range of the nodes B, C carrying stream 1, time slot interference can occur on time slot 3. For example, data packets from node B and node Y will collide at node C and/or node Z.

Overview: Time Slot Interference Detection & Recovery

Techniques are provided for detecting and resolving time slot interference. Slot interference can be detected at either a transmitter node or receiver node. For example, in the example shown in FIG. 14, either transmitter node (node B or node Y) or receiver node (node C or node Z) can detect this interference.

Once the slot interference is detected, techniques are provided to free up the slots used by the nodes along the route between source node and destination node, and re-allocate fresh slots that are free of interference.

Figure 14:
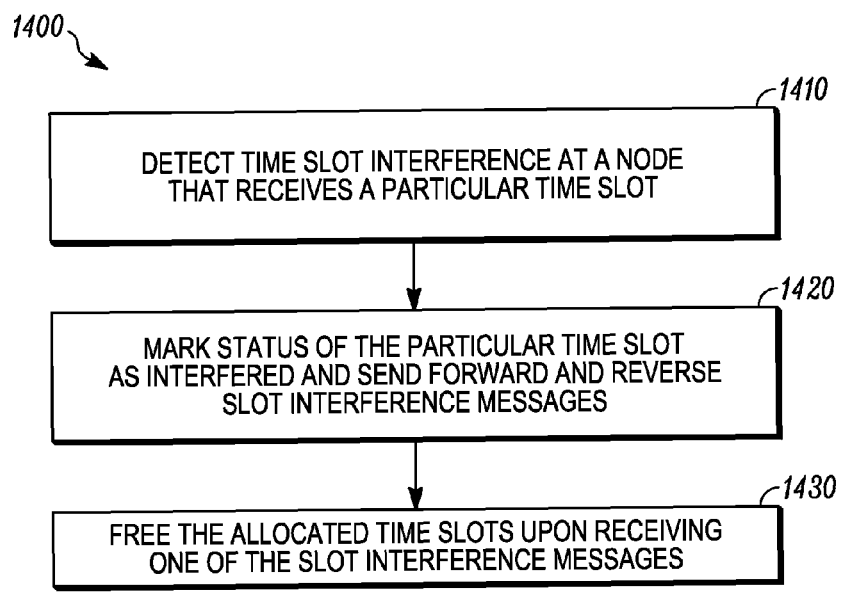
FIG. 14 is a flowchart showing an exemplary method for slot interference detection and recovery in accordance with some embodiments of the invention.

FIG. 14 is a flowchart showing an exemplary method 1400 for slot interference detection and recovery in accordance with some embodiments of the invention.

At step 1410, a node which receives on a particular time slot can detect time slot interference (e.g., that the particular slot which was allocated for reception is in interference). The node can detect time slot interference according to a number of different techniques some of which will be described below.

At step 1420, upon detecting time slot interference, the node can mark the status of the time slot as interfered, and transmit Slot Interference message in both directions (a reverse Slot Interference message towards source node and a forward Slot Interference message towards destination node). This time slot will not be used in future allocations for certain time.

At step 1430, the nodes which receive the Slot Interference message mark the allocated time slots as free.

Slot Interference Detection Techniques

As noted above, at step 1410, either the receiver node or transmitter node can detect slot allocation conflicts or "interference" on time slots using a number of techniques. A few exemplary techniques will be described below.

Slot interference Detection Techniques at a Transmitter Node

In one implementation, a transmitter node can detect slot interference by detecting a number (e.g., three) of consecutive lost packets on same time slot. In this implementation, each node maintains a collision count for its time slot. This information is stored in the SAT as scout table entry. Each data packet sent on TDCH requires slot acknowledgement (signal to notify correct reception of packet within the same time slot) for counting consecutive collisions, but no retransmission in case of collision. With each successful data packet transmission, collision count will be reset to zero. When the certain number of consecutive collisions is detected on same time slot, the transmitter node will announce interference on this time slot, and then initiate interference recovery.

In an alternate implementation, a transmitter node can detect slot interference by measuring the average packet completion rate on a particular time slot (e.g., using last 10 packets of sent information). Each node maintains average packet completion rate for its individual time slots. In the previous implementation, if two nodes are allocated same time slot but transmitting with different packet inter-arrival rate, it may not be necessary that 3 consecutive packets will collide (e.g., every now and then packets will collide). To detect time slot interference in such cases, a node may maintain average packet completion rate for a certain number of packets (e.g., the last 10 packets) sent on a particular time slot. If average packet completion rate value goes below a threshold, the transmitter/source node may declare slot interference.

In an alternate implementation, the transmitter node can detect slot interference if it receives a Hello message indicating that more than one of its neighbors is receiving on the same time slot as it is transmitting and given that the data stream is not intended for multicast.

In an alternate implementation, the transmitter node can detect slot interference if it receives a Hello message indicating that one of the neighbors is receiving on a time slot and that neighbor is not in the list of intended destinations when the data stream is intended for multicast.

Slot Interference Detection Techniques at a Receiver Node

In one implementation, a receiver node can detect slot interference by receiving a certain number (e.g., three) of consecutive error packets. A node is allocated different slots in a frame for transmission (TX) and reception (RX). The node may sleep through other times and wake up during its TX and RX slots. If a node receives energy on a slot allocated for reception (e.g., it can sync on a signal but cannot decode the packet correctly), it means that collision has happened on this slot. After a certain number (e.g., three) of consecutive collisions, the receiver node declares slot interference and performs recovery as described below.

In an alternate implementation, the receiver node can detect slot interference when it receives a Hello message from a neighbor and concludes that more than one of its neighbors is transmitting on the same time slot on which it is receiving. For the time slots on which a node is receiving, it maintains the information of the neighbor node that is transmitting to it (refer SAT fields). When the current node receives a Hello message from a neighbor indicating that it is transmitting on same time slot as this node is receiving, the current node will compare this neighbor (originator of Hello message) with its intended transmitter (source of the stream). If these nodes are different, current node will conclude that it is receiving from more than one transmission at the same time slot and declare slot interference.

Slot Interference Recovery

When slot interference is detected, detecting node sends out Slot Interference message, one reverse Slot Interference message (towards source node) and one forward Slot Interference message (towards destination node). These interference messages will be processed using per slot interference processing and forwarded in their respective directions to resolve slot interference.

Figure 15:
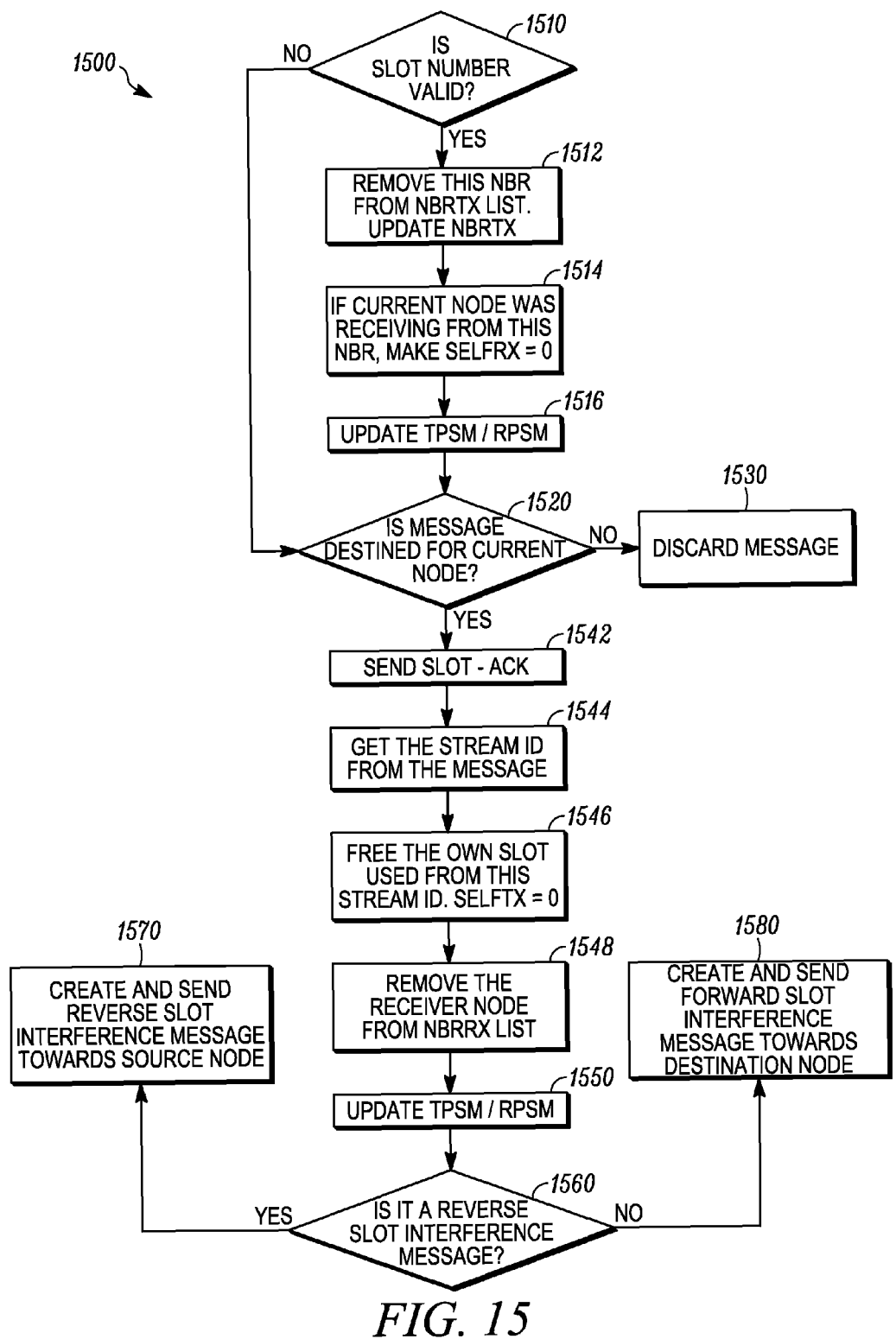
FIG. 15 is a flowchart showing an exemplary method for processing slot interference information in accordance with some embodiments of the invention.

FIG. 15 is a flowchart 1500 showing an exemplary method for processing slot interference information in accordance with some embodiments of the invention. A node receiving a Slot Interference message can process it (depending upon the information inside the message) using the techniques described below. The Slot Interference message may comprise a slot number being used for transmission for a data stream, a stream ID and an indication of whether the Slot Interference message is a reverse or forward Slot Interference message.

When a node receives a Slot Interference message, it processes it and updates its LCM table entries (NbrTx, NbrRx, SelfTx, and SelfRx). The process starts at step 1510, where the node determines if the slot number in Slot Interference message is valid. (Note: Slot number will be invalid if the Slot Interference message is generated by destination node as it does not use any slot for transmission and only for reception).

If the node determines that the slot number is valid, then the process proceeds to step 1512, where the node removes this Nbr (the originator of the Slot Interference message) from the NbrTX list, and updates the NbrTX. If no neighbors are left in NbrTX list, NbrTx is set to 0. The process then proceeds to step 1514 where the node determines if it was receiving from this neighbor (Nbr). If yes, it marks the slot used for reception as free makes SelfRX equal to zero. The process then proceeds to step 1516 where the node updates the TPSM/RPSM i.e. updating status of each slot for reflect current transmission/reception availability. It then proceeds to step 1520, where the node determines if the Slot Interference message is destined for the node.

If the node determines that the slot number is invalid, then the process proceeds to step 1520, where the node determines if the Slot Interference message is destined for the node. If the Slot Interference message is not destined for the node, then the node discards the Slot Interference message at step 1530. If the Slot Interference message is destined for the node, the node sends a slot ACK acknowledging the receipt of Slot Interference message at step 1542, and gets the stream number of the data stream from the Slot Interference message at step 1544. At step 1546, the node frees the slots used by itself for this stream number (note: stream number is used to lookup Slot Allocation Table which keeps all the slots allocated for each unique data stream). The node sets SelfTX equal to zero and at step 1548, the node removes the receiver node (of its transmission) from the NbrRX list, and updates the TPSM/RPSM at step 1550.

The process then proceeds to step 1560 where the node determines if the Slot Interference message is a reverse Slot Interference message. If the node determines that Slot Interference message is a reverse Slot Interference message, then at step 1570, the node sends a reverse Slot Interference message towards the source node. By contrast, if the node determines that Slot Interference message is not a reverse Slot Interference message (i.e., is a forward Slot Interference message), then at step 1580, the node sends a forward Slot Interference message towards the destination node.

Slot Interference Recovery Options

Slot interference recovery can be performed, for example, by performing a full recovery or a local recovery. A full recovery involves removing current slot allocation through the entire path between source and destination node and re-schedule fresh slots for communication. A local recovery involves locally repairing interfered slots i.e. free only the interfered slot and re-schedule new slots. These slot interference recovery options will now be described in detail.

Full Recovery

In a full recovery, a node detecting interference will mark the status of the interfered slot as "Interfered" and send out Slot Interference messages in both directions (e.g., towards source node and destination node). Slot interference message will travel towards source and destination node and clear all the slots that are being used along the entire route. The source node will start new slot allocation process on this route (keeping the context of the interfered slot).

If interference was detected by the transmitter node, the transmitter node clears the SelfTX for the slot number used for transmission (TX), sets the state of the slot number as interfered (this state can be cleared after short time) to avoid reuse of same slot, removes the destination node that was receiving in this slot from the NbrRX list (set NbrRx to 0 if no more Nbrs in the NbrRx list), sends a reverse Slot Interference message (unicast to previous hop address towards source node), sends a forward Slot Interference message (unicast to next hop address towards destination node), and removes the scout table entry for this stream number. Nodes receiving Slot Interference message will free the slot mentioned in the packet and create forward or reverse slot interference (depending upon slot interference packet type received). The Slot Interference message will be forwarded towards both source node and destination node of the stream. Each node receiving the Slot Interference message will free their slots used for this stream. Source node will then start a fresh Scout Request process (Scout Request without Local_Recovery flag).

If slot interference was detected by the receiver node, then the receiver node clears the SelfRX for the slot number used for receiver node, sets the state of the slot number as interfered (this state can be cleared after short time) to avoid reuse of same slot, removes the previous hop node that was sending in this slot from NbrTx list (set NbrTx to 0 if no more Nbrs in the NbrTx list), sends a reverse Slot Interference message (unicast to previous_hop address towards source node) and a forward slot interference (unicast to next hop address towards destination node), and removes the scout table entry for this stream number.

Local Recovery

The local recovery procedure enables slot rescheduling only for the interfered nodes (and not the full route). When interference is detected by the transmitter node, the transmitter node sends out a Slot Interference message (with a broadcast address as destination) followed by a Scout Request message. The Slot Interference message can be a stand alone message or a Scout Error message can be used for same purpose with certain flags.

Nodes which receive this Slot Interference message clear the slot and do not forward it. While generating Scout Request message, transmitter node marks the interfered slot as "interfered" in its TPSM table. The Scout Request message will be sent out with a "Local_Recovery" flag enabled. The next hop node processes the Scout Request message but does not forward it further. A three-way packet exchange (Scout Request, Scout Reply and Scout Ack) then takes place to get a new slot.

In the foregoing specification, specific embodiments of the present invention have been described. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. In an ad hoc network comprising a first node which is assigned a particular time slot for transmission of a first data stream and a second node which has been assigned the particular time slot for transmission of a second data stream, a method comprising:
    detecting time slot interference on the particular time slot at either one or more of:
    a receiver node that receives on the particular time slot when the transmission of the first data stream on the particular time slot interferes with the transmission of the second data stream on the particular time slot;
    a transmitter node that transmits on the particular time slot when the transmission of the first data stream on the particular time slot interferes with the transmission of the second data stream on the particular time slot; and
    recovering from time slot interference on the particular time slot, wherein recovering from time slot interference on the particular time slot, comprises:
    marking the status of the particular time slot as interfered at any of the nodes which detect time slot interference upon detecting time slot interference such that the particular time slot is not used for a time period after being designated as interfered and is designated as being free after the time period; and
    transmitting, from either the transmitter node or the receiver node which detect time slot interference on the particular time slot, either:
    a broadcast Slot Interference message to all the neighbor nodes upon detecting time slot interference on the particular time slot; or
    Slot Interference messages upon detecting time slot interference on the particular time slot, wherein the Slot Interference messages comprise: a unicast reverse Slot Interference message transmitted towards source node, and a unicast forward Slot Interference message transmitted towards destination node.

2. A method according to claim 1, wherein each of the Slot Interference messages comprise:
    at least one interfered slot number when the transmission of the first data stream on the particular time slot interferes with the transmission of the second data stream on the particular time slot;
    a stream number; and
    a flag indicating whether the Slot Interference message is a forward Slot Interference message or reverse Slot Interference message.

3. A method according to claim 1, further comprising:
    performing a full interference recovery process by:
    clearing the time slots being used at each of the nodes along the route between the source node and the destination node by marking each of the currently allocated time slots as being free at each of the nodes which receive at least one of the unicast reverse and forward Slot Interference messages; and
    re-allocating new time slots at each of the nodes along the route between the source node and the destination node.

4. A method according to claim 3, wherein re-allocating new time slots comprises:
    transmitting, from the source node, a Scout Request message to start a new time slot allocation process; and
    re-scheduling non-interfered time slots to either the first node or the second node.

5. A method according to claim 1, further comprising:
    performing a local interference recovery process by:
    clearing the particular time slots being interfered with by marking, at each of the neighboring nodes which receive the broadcast Slot Interference message, each of the particular time slots being interfered with as being free; and
    re-allocating new time slots for each of the currently interfered time slots.

6. A method according to claim 5, wherein re-allocating new time slots comprises:
    transmitting, from the node which detected interference, a Scout Request message to start a new time slot allocation process, wherein the Scout Request message has a local recovery flag enabled; and
    re-scheduling new time slots which are interference free to either the first node or the second node.

7. A method of operation of a node to detect time slot interference on a particular time slot within an ad hoc network comprising:
    maintaining a Local Slot Allocation Table in a memory of the node, wherein the local slot allocation table comprises time slot allocation, previous hop node information, and next hop node information for receiving and transmitting one or more data streams;

receiving a Hello message from a neighbor node, wherein the Hello message includes a Time Slot Utilization Map of the neighbor node;

detecting interference on the particular time slot when the particular time slot is marked for transmission in the Time Slot Utilization Map of the received Hello message and is marked for transmission in the Local Slot Allocation Table;

prior to the detecting interference operation:

assigning the particular time slot for transmission of a first data stream by the node; and assigning the particular time slot for transmission of a second data stream by the neighbor node;

detecting time slot interference on the particular time slot comprises:

detecting collisions on the particular time slot when the transmission of the first data stream on the particular time slot interferes with the transmission of the second data stream on the particular time slot;

counting a number of consecutive collisions on the particular time slot, wherein the count is reset upon successful transmission on the particular time slot; and determining that the number of consecutive collisions on the particular time slot exceeds a predetermined number.

8. The method of operation of a node as claimed in claim 7, wherein detecting time slot interference on the particular time slot further comprises:

determining a packet completion rate for a predetermined number of packets sent;

measuring an average packet completion rate for the predetermined number of packets sent on the particular time slot; and determining that the average packet completion rate is less than a threshold.

9. The method of operation of a node as claimed in claim 7, wherein the Time Slot Utilization Map of the received Hello message indicates that more than one neighbor node of the node is receiving on the particular time slot.

10. The method of operation of a node as claimed in claim 7, comprising:

checking a list of intended destination nodes in the Local Slot Allocation Table for a data stream being multicast by the node; and determining that the neighbor node is not on the list of intended destination nodes for the multicast data stream.

11. The method of operation of a node as claimed in claim 7, further comprising:

receiving a packet at the node on the particular time slot;

detecting an error packet within the received packet, wherein the error packet is detected each time the node receives energy on the particular time slot but can not decode the packet;

accumulating a number of consecutive error packets received on the particular time slot; and determining that the number of consecutive error packets exceeds a threshold received on the particular time slot.

12. The method of operation of a node as claimed in claim 7, wherein the node maintains a list of identifiers for neighbor nodes the node is currently receiving from, the method further comprising:

receiving, at the node, a Hello message from each of a plurality of neighbor nodes; and comparing an identifier for each of the neighbor nodes of which the Hello messages were received to the list of identifiers to determine if more than one neighbor node of the node is transmitting on the particular time slot.

13. The method of operation of a node as claimed in claim 7, further comprising:

transmitting at least one Slot Interference message when the number of consecutive collisions on the particular time slot exceeds the predetermined number.

14. The method of operation of a node as claimed in claim 8, further comprising:

transmitting at least one Slot Interference message when the average packet completion rate for a predetermined number of packets sent on a particular time slot is less than the threshold.

15. The method of operation of a node as claimed in claim 9, further comprising:

transmitting at least one Slot Interference message when the node receives the Hello message indicating that more than one neighbor node is receiving on the particular time slot.

16. The method of operation of a node as claimed in claim 10, further comprising:

transmitting at least one Slot Interference message when the node receives the Hello message indicating that the neighbor node is receiving on the particular time slot and the neighbor node is not on the list of intended destination nodes for the multicast data stream.

17. The method of operation of a node as claimed in claim 11, further comprising:

transmitting at least one Slot Interference message when the number of consecutive error packets received on the particular time slot exceeds the threshold.

18. The method of operation of a node as claimed in claim 12, further comprising:

transmitting at least one Slot Interference message when it is determined that more than one neighbor node is transmitting on the particular time slot.

19. The method of operation of a node as claimed in claim 7, wherein the detecting interference operation further comprises detecting interference when:

the particular time slot is marked for transmission in the Time Slot Utilization Map of the received Hello message, the particular time slot is marked for reception in the Local Slot Allocation Table, and a previous hop node associated with the particular time slot in the Local Slot Allocation Table is not the neighbor node from which the Hello message was received.

20. The method of operation of a node as claimed in claim 7, wherein the detecting interference operation further comprises detecting interference when:

the particular time slot is marked for reception in the Time Slot Utilization Map of the received Hello message, the particular time slot is marked for transmission in the Local Slot Allocation Table, a next hop node associated with the particular time slot in the Local Slot Allocation Table is not the neighbor node from which the Hello message was received, and a data stream being transmitted is not a multicast data stream.

* * * * *